Dec. 30, 1952 M. C. THRASH 2,623,696

NAVIGATIONAL COMPUTER

Original Filed Nov. 21, 1945 2 SHEETS—SHEET 1

Inventor

Millard C. Thrash

By [signature]

Attorney

INVENTOR.
Millard C. Thrash
BY
Walter S. Paul
ATTORNEYS

Patented Dec. 30, 1952

2,623,696

UNITED STATES PATENT OFFICE 2,623,696

NAVIGATIONAL COMPUTER

Millard C. Thrash, United States Navy

Original application November 21, 1945, Serial No. 630,109, now Patent No. 2,569,505, dated October 2, 1951. Divided and this application February 28, 1950, Serial No. 146,892

5 Claims. (Cl. 235—84)

(Granted under the act of March 3, 1883, as amended April 30, 1928; 370 O. G. 757)

The present invention relates to a navigational computer for use by aircraft pilots, and more particularly to a navigational computer requiring the use of only one hand of the pilot for solving various navigational problems. The computer according to the present invention is made small enough to be carried in the pilot's pocket.

This application is a division of application Serial No. 630,109 filed November 21, 1945, for Navigational Computer, now Patent 2,569,505.

An object of the present invention is the provision of a navigational computer possessing the features of a conventional computer, but having additional advantageous features whereby navigational problems may be solved without requiring any special knowledge on the part of the operator.

Another object is to provide a navigational computer for rapidly solving most navigational problems by manipulation with only one hand.

A further object of this invention is the provision of a navigational computer which substantially eliminates any possibilities of error due to calculations made by the operator.

Still another object is to provide a navigational computer for rapidly solving for the correction in compass heading required to make good a predetermined track in accordance with the wind encountered.

A still further object is to provide a navigational computer for determining the ground speed of an aircraft, or for maintaining a desired bearing on a moving object, such as a ship or other aircraft.

Figure 1:
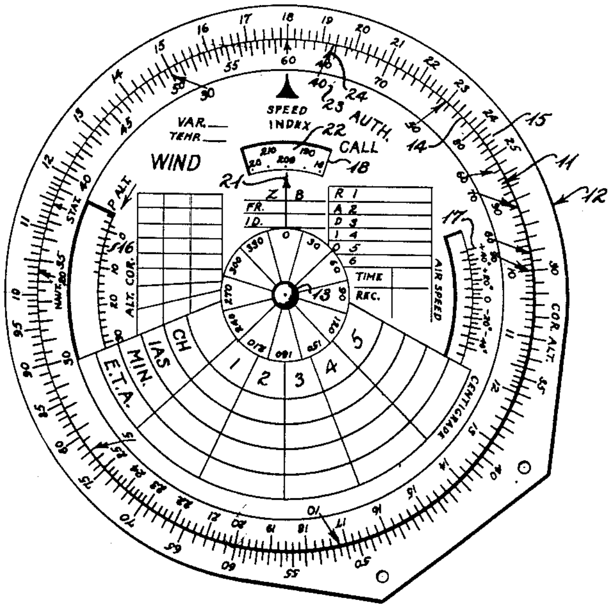
Figure 2:
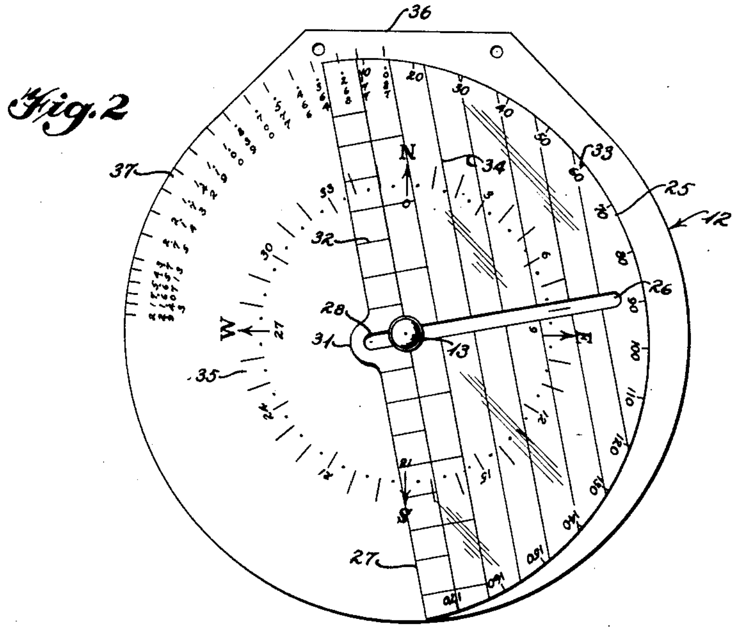
Figure 3:
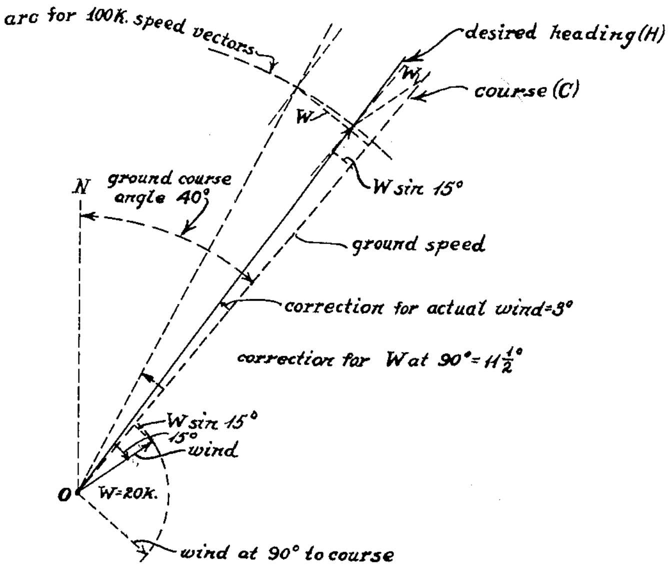
Figure 4:
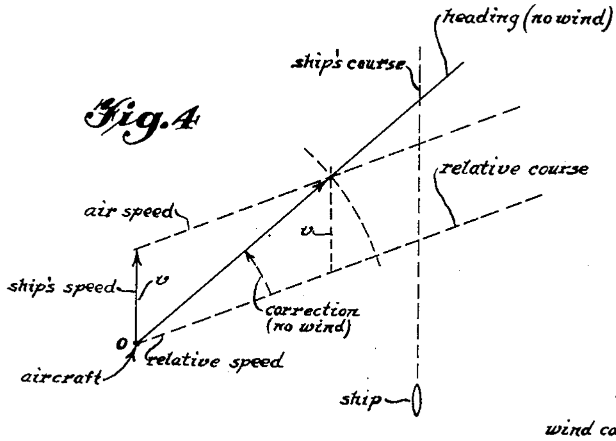
Figure 5:
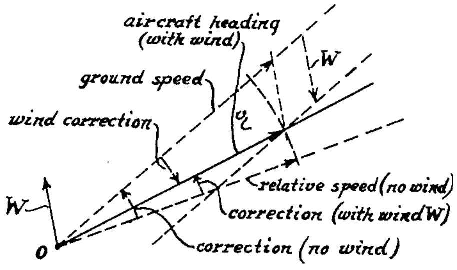

Other and more specific objects will become more apparent in the following detailed description having reference to the accompanying drawing, wherein:

Fig. 1 is a front view of one form of computer according to the present invention, Fig. 2 is a rear view of the computer of Fig. 1, Fig. 3 is a geometric illustration of a heading correction problem, and Figs. 4 and 5 are geometric representations of problems involving ship movement in no wind and with an assumed wind respectively.

Referring now to the drawing, wherein like reference characters designate like or corresponding parts throughout the several views, there is shown in Fig. 1 a pair of substantially circular plates 11 and 12, preferably made of aluminum or other light material, plates 11 and 12 being mounted for relative rotational motion by means of pin 13.

Plate 11 has inscribed thereon, in any suitable manner, a circumferential logarithmic slide rule scale 14, which cooperates with a similar scale 15, inscribed on plate 12, in a manner to be described below, and temperature and altitude correction scales 16 and 17, respectively, spaced inwardly from the circumference thereof, for correcting the altitude and air speed readings.

A portion of plate 11 inside of circumferential scale 14 has a cut-out window 18 with a pointer 21 centered therein for reading a circular air speed scale 22 on plate 12. Also inscribed on plate 11, inwardly of scale 14 is a circular degrees scale 23, the corresponding values of the sines of the angles indicated on scale 23 being designated on scale 14 by means of arrows 24, or any other suitable means.

The device thus far described may be readily utilized by an operator for quickly and accurately determining the ground speed of the aircraft, and the corrections necessary to maintain a predetermined course while flying in wind of any velocity and from any direction. Thus, the device may be used for first determining the degrees of correction of heading an aircraft, or other free airborne body, must make from its desired course into the wind in order to track along that course, if the wind is assumed to be from a direction 90° relative to the desired course.

In theory, it can be readily seen that the correction angle for maintaining a predetermined course while flying in a wind of 20 knot velocity from a direction 90° relative to the desired course is equal to the angle whose sine has the value of 20 divided by the airspeed in knots. Furthermore, if the wind velocity is any given multiple, K, of 20 knots, then the sine of the desired correction angle is equal to K times the correction angle for a 20 knot wind, if the angle is sufficiently small so that the sine of the angle varies approximately as the angle.

Accordingly, by arranging scales 15 and 22 so that scale 15 is a numerical indication of the angle whose sine is equal to 20 divided by the airspeed setting on scale 22, the desired correction angle for any given airspeed due to a 20 knot wind relative 90° to the desired course is obtained by reading the value on scale 15 opposite the point 20 on scale 14. It will be understood that when dealing with logarithmic scales the actual placement of the decimal point must be carried out by the operator. For example, the reading on scale 15 is 60. The operator has but to properly place the decimal point and he has an answer of 6°. The method of determining the proper decade of logarithmic scale is obvious. In other words the operator would know that 60° or .6° would be incorrect. This arrangement obviously requires a logarithmic speed scale running counter-clockwise and set off with values from 65 to 600. The separation between 600 and 65 being the same as between the values 600 and 650, or 60 and 65, making a complete and continuous circular logarithmic scale like the others except that it runs in the opposite direction. To obtain the correction angle for wind velocities other than 20 knots, a reading is taken on scale 15 opposite the value on scale 14 representing the actual wind velocity. Thus, although the assumption that the sine of the angle varies as the angle introduces a certain error, it is apparent that within the ranges generally encountered, airspeeds of from 65 to 600 knots on scale 22, this error is virtually negligible.

Having determined the correction for a wind relative 90° to the desired course, it is then necessary to determine the correction for the actual direction of the wind. It can readily be demonstrated that the correction necessary for winds at angles other than 90° is a function of the sine of that angle, and, more exactly, the sine of the angle of correction is equal to the sine of the correction angle for a wind relative 90° times the sine of the actual angle of the wind. However, under the earlier assumption as to small angles, this relationship may be simplified to read that the angle of correction is equal to the correction angle for a wind relative 90° times the sine of the actual angle of the wind.

Accordingly, for the purpose of determining the desired specific correction angle for a wind at an angle other than 90° relative to the course, plate 11 is rotated relative to plate 12 until the value 10 on scale 14 is opposite this correction angle on scale 15 for a wind relative 90°. With the computer in this position, the figure on scale 23 representing the actual direction of the wind relative to the course is found, the arrow 24 from this figure terminating on scale 14 at the value corresponding to the sine of the actual angle of the wind. Accordingly, the desired specific correction angle is read on scale 15 at the point opposite the termination on scale 14 of arrow 24. Again, it is left to the operator to determine the proper decade for the answer. Reference is made to the example above where the correction angle for a 90° relative wind of 20 knots was 6°. For a wind which is 40° relative to the course rather than 90°, it is but necessary to position the number 10 of scale 14 on the number 60 of scale 15, this being the indication for a 90° relative wind. Arrow 24 extending from the number 40 on scale 23 points to the answer on scale 15. The arrow would point midway between numbers 38 and 39. Thus the pilot, knowing the correction angle was 6° for a 90° relative wind, knows that the correction angle for a 40° relative wind would be 3.85°.

This may be illustrated by the following problem represented geometrically by Fig. 3. Assuming a desired course C for an aircraft flying at an air-speed of 100 knots and a wind W of 20 knots at 15° relative to the course, the specific correction angle may be found by first setting the air-speed scale at 100, the reading on scale 15 opposite 20 (representing wind velocity) on the scale 14 is found to be approximately 11.4°, which gives us the correction angle for a wind of 20 knots relative 90° to the course. Then the unity or "10" mark on the scale 14 is set to this valne 11.4 on scale 15, and opposite the arrow 24 from 15 (representing the relative wind angle) on scale 23, the reading on scale 15 indicates about 3.0° for the desired specific correction angle. This correction should give the proper heading H on which the aircraft should be set to maintain it on the course C. For example, if the course C is 40°, the heading should be 37°.

The computer of the present invention may further be utilized to determine the ground speed of an aircraft for a given airspeed and a given wind velocity. If the wind is from dead ahead, after the craft's heading has been corrected for drift as outlined above, the craft's ground speed will be its true airspeed minus the velocity of the wind. On the other hand, if the wind is from dead astern, the craft's ground speed will be equal to its true airspeed plus the velocity of the wind. The effect that other relative winds will have on the craft's ground speed is generally more difficult to compute, but, under the assumption that the angle between the heading and course is relatively small, it can be shown that the ground speed is equal to the airspeed plus or minus the velocity of the wind times the cosine of the angle between the course and the wind, as may be readily seen in Fig. 3.

In order to adapt the computer of the present invention to measure the ground speed, the sine of the complementary angle of that mentioned above is utilized. Thus, to compute the ground speed, plate 11 is rotated until the value 10 on scale 14 is opposite the wind velocity value on scale 15 of plate 12. The value on scale 15 opposite arrow 24 from the complementary angle on scale 23 then represents the components of the wind velocity which must be added or subtracted from the airspeed, depending upon the direction of the wind, to obtain the ground speed. This value on scale 15 for the above problem turns out to be about 19 knots, which indicates that the ground speed is 219 knots along the course.

Thus, the problems of determining the angular corrections necessary to tracking along a course, and of determining ground speeds are solved very quickly and accurately without any particular knowledge of navigation.

Referring now to Fig. 2, wherein is shown a rear view of the computer of the present invention, a substantially semicircular transparent sheet 25 is slidably mounted on plate 12 by means of pin 13 and a slot 26 in sheet 25, centrally thereof and perpendicular to a straight-edge 27 on sheet 25. The end 28 of slot 26 at straight-edge 27 is bounded by a lug 31 protruding from straight-edge 27, lug 31 permitting straight-edge 27 to be positioned in alignment with pin 13 when sheet 25 is moved so that pin 13 is at the end of slot 26. Sheet 25 has inscribed thereon, in any suitable manner, a distance scale 32 marked off along straight-edge 27, a degree scale 33 around its circumferential edge from zero to 180°, and a series of spaced lines 34 parallel to straight-edge 27. Suitably inscribed on the rear of plate 12 is a compass rose 35 with its center at pin 13.

The back of the computer may be used in connection with maps, charts or photographs, which may be placed between sheet 25 and plate 12, for tracking purposes. Thus, straight-edge 27 may be used to measure off distances between any two points on the map or chart, while at the same time indicating the bearing of one of these points with respect to the other by reading the one of the spaced lines 34 closest to pin 13 on compass rose 35.

In addition, plate 12 has a straight-edge portion 36 along its circumference for a short distance, and a scale 37 suitably inscribed circumferentially around approximately one-fourth of the circumference, beginning with zero at the radius which is perpendicular to straight-edge portion 36 and progressing around the circumference. Scale 37 is marked in accordance with the tangent values of the angular distances from this perpendicular radius.

This portion of the computer may be used conveniently for determining the range between the aircraft and an object by holding the computer vertically with straight-edge portion 36 in line with the horizon and toward the object, and then by turning straight-edge 27 of sheet 25 in line with the sight to this object through the center of pin 13. The value read at the intersection of straight-edge 27 and scale 37, multiplied by the altitude at which the aircraft is flying will yield the horizontal range of the object, this multiplication being performed on scales 14 and 15.

The computer may be provided also with replaceable sheets having tables printed thereon, such as shown in Fig. 1, for use in taking down data on a flight, on the central portion of plate 11 which is not occupied by the scales, or this portion of plate 11 may be made with a sanded surface, with the outlines of the tables permanently etched thereon so that pencil data may be entered temporarily on the tables and then easily erased or washed off for repetitive use. A further modification may be made by printing the scales and tables with luminous paint so as to make it possible for the computer to be used in night flying.

If a large tracking surface is desired, this modification attached to a conventional plotting board will make the board a better tracking device. It eliminates the necessity for cluttering up the board with markings necessary to solving wind and ship vector problems. A further advantage of solving problems with the subject device is that of being able to deal with all speeds from 65 to 600 knots without having to depend on a large board for accuracy. A cross-country flyer who has his charts and this computer has all the navigation devices he needs.

When a problem involves ship movement, that is relative motion, the corrections pertaining to the ship's movement must be made first, as illustrated in Fig. 4. The ship's movement is handled in the same manner as the air movement or wind. The correction of heading necessary to maintain a given course relative to the moving ship in no wind condition is determined first. Then the direction of the ship's travel relative to the plane's heading is determined and the speed of relative motion in a no wind condition is solved for. From this point on the heading correction necessary for a wind W and the correction necessary for determining the ground speed are determined in the manner described above. As may be seen in Fig. 5, the algebraic sum of the corrections for ship movement and wind gives the correction necessary for maintaining a given course relative to a moving ship in the wind. The same is true for determining the actual speed of relative motion. Various other modifications in form and arrangement of the several parts of these computers may be made without departing from the spirit and scope of this invention, as defined in the appended claims.

The invention described herein may be manufactured and used by or for the Government of the United States of America for governmental purposes without the payment of any royalties thereon or therefor.

What is claimed is:

1. In a navigational computer for determining the ground speed and heading of an aircraft, the combination comprising: a base plate having a circumferential logarithmic slide rule scale inscribed thereon; a member rotatably mounted on said plate and having a circumferential logarithmic slide rule scale inscribed thereon for cooperation with the first-mentioned scale; a circular degree scale inscribed on said member inwardly of its slide rule scale; means on said member for indicating on its slide rule scale the sine values of the angles on said degree scale; a circular airspeed scale inscribed on said plate inwardly of its slide rule scale; and said rotatable member having a window therein and an index means adjacent thereto, said index means being arranged to point to numbers on said airspeed scale, the arrangement of the various scales being such that the outer logarithmic scale on the base plate indicates a number which represents an angle whose sine is equal to the corresponding number on the logarithmic scale of the rotatable member divided by the airspeed indicated by said index means.

2. In a navigational computer, the combination comprising: a pair of relatively rotatable members each having a circumferential logarithmic slide rule scale inscribed thereon; a circular degree scale inscribed on one of said members inwardly of its slide rule scale; means on said one member for indicating on its slide rule scale the sine values of the angles on said degree scale; a circular logarithmic airspeed scale inscribed on the other of said members inwardly of its slide rule scale said one member having a window therein and an index adjacent thereto, said airspeed scale running in the opposite direction from the other scales and arranged so that the angle whose sine is equal to the ratio of any fixed number on the logarithmic scale of said one member to the setting on said airspeed scale may be found on the logarithmic scale of the other member opposite said fixed number.

3. In a navigation computer, the combination comprising: a pair of relatively rotatable members having cooperating circular logarithmic scales inscribed thereon, respectively, a circular degree scale inscribed on one of said members, the corresponding values of the sines of the angles on said degree scale being designated on its logarithmic scale; a circular logarithmic airspeed scale running in the opposite direction from the aforementioned scales and inscribed on the other of said members; and an index on said one member for cooperation with said airspeed scale, said airspeed scale having its numbers positioned with respect to said aforementioned logarithmic scales so that the angle, whose sine is equal to the ratio of any fixed number in the logarithmic scale of said one member to the setting of said airspeed scale, will be indicated on the logarithmic scale of said other member opposite said fixed number.

4. In a navigational computer, the combination comprising: a pair of relatively rotatable members having cooperating circumferential logarithmic slide rule scales inscribed thereon, respectively; a circular logarithmic airspeed scale running in the opposite direction inscribed on one of said members; and index means on the other of said members positioned for designating on the slide rule scale of said one member the value of the angle whose sine is equal to the ratio of a fixed number on the other slide rule scale opposite said value, to the setting on said airspeed scale.

5. The combination according to claim 4, wherein said means comprises an annular cut-out portion on said other member through which said airspeed scale is visible, and an index on said other member at the center of said portion.

MILLARD C. THRASH.

REFERENCES CITED

The following references are of record in the file of this patent:

UNITED STATES PATENTS

| Number | Name | Date |
|---|---|---|
| 2,438,730 | Watter | Mar. 30, 1948 |

OTHER REFERENCES

"Practical Air Navigation," page 158, by Thorburn C. Lyon, comprising Civil Aeronautics Bulletin No. 24 of 1945.